No. 712,102. Patented Oct. 28, 1902.
F. F. SMITH.
CORN PLANTER.
(Application filed Aug. 7, 1902.)
(No Model.) 2 Sheets—Sheet 1.
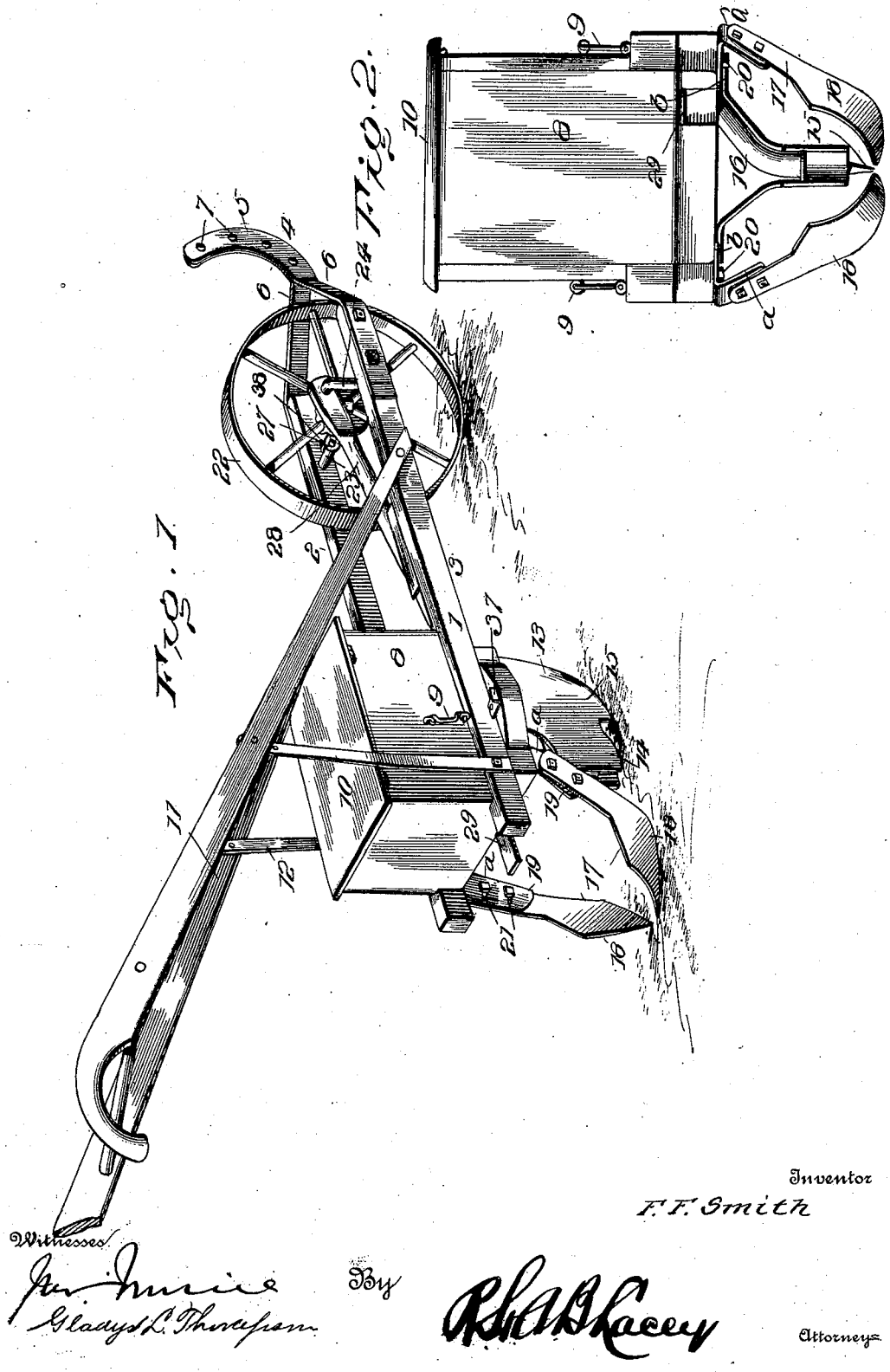
Inventor
F. F. Smith No. 712,102. Patented Oct. 28, 1902.
F. F. SMITH.
CORN PLANTER.
Application filed Aug. 7, 1902.
(No Model.) 2 Sheets—Sheet 2.
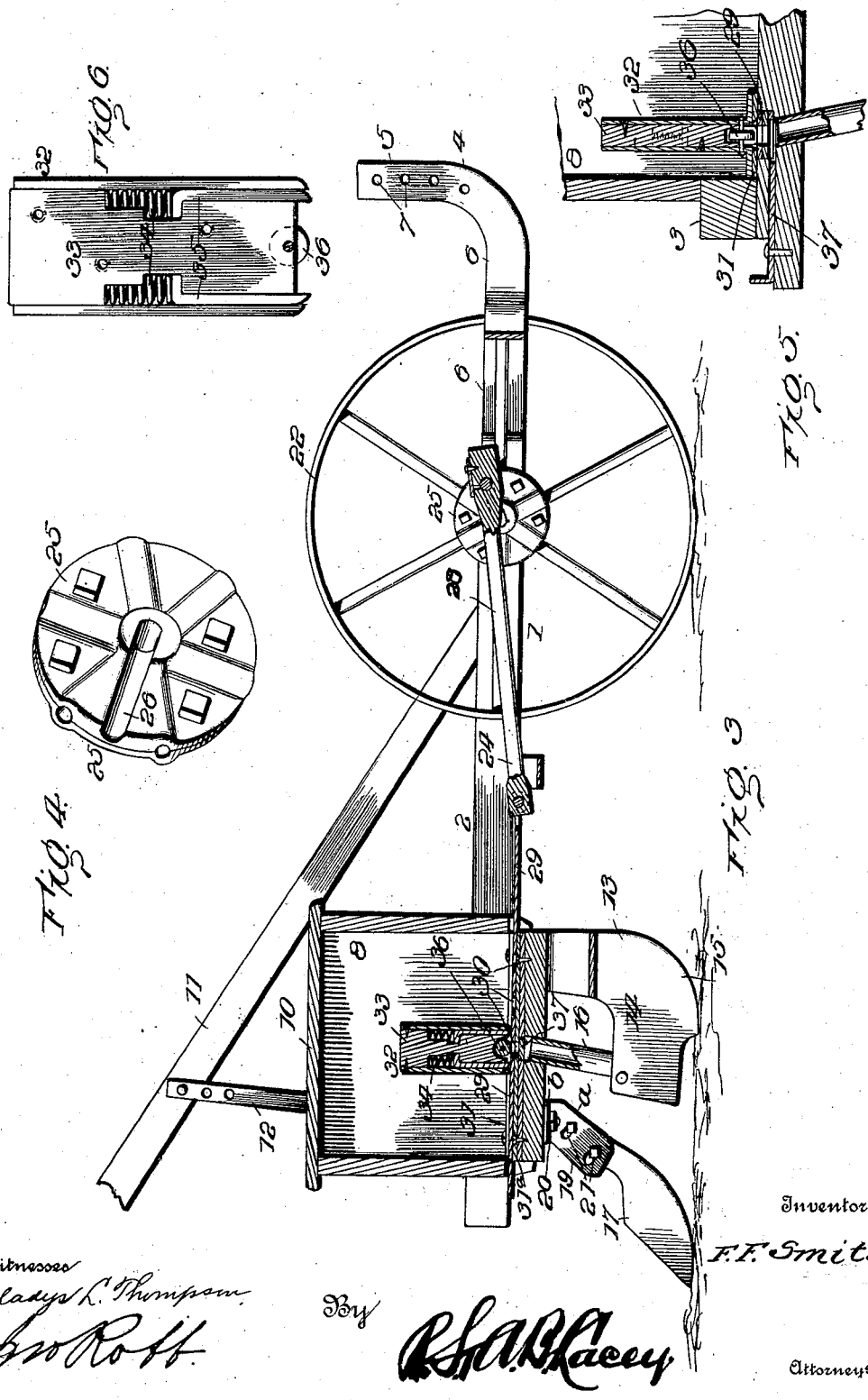
Witnesses
Gladys L. Thompson
Jno Roff
Inventor
F. F. Smith
By
R. S. & A. B. Lacey
Attorneys.

UNITED STATES PATENT OFFICE.

FREDERICK FORTMYER SMITH, OF VANDALIA, ILLINOIS.

CORN-PLANTER.

SPECIFICATION forming part of Letters Patent No. 712,102, dated October 28, 1902.

Application filed August 7, 1902. Serial No. 118,805. (No model.)

*To all whom it may concern:*

Be it known that I, FREDERICK FORTMYER SMITH, a citizen of the United States, residing at Vandalia, in the county of Fayette and State of Illinois, have invented certain new and useful Improvements in Corn-Planters, of which the following is a specification.

This invention aims to provide improvements in corn-planters, and relates to the type of these devices embodying the ordinary frame construction having a hopper thereon and a furrow opener and closers depending from the frame. A wheel is journaled in the fore part of the planter-frame, and this, cooperating with the seed-dropping mechanism, actuates the seed slide or dropper, which is mounted for reciprocatory movement in guides upon the bottom of the hopper.

The invention further has for its object to provide a novel and advantageous structure of the parts constituting the seed mechanism which prevents any clogging of the seed in the hopper, admitting of a more certain and steady dropping of the seed into the grain-tube and from thence into the ground, means being especially employed to secure a perfect working of the seed-slide.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view. Fig. 2 is a rear view of the hopper and furrow opener and closers. Fig. 3 is a longitudinal section through the planter. Fig. 4 is a detail perspective view of the hub of the wheel. Fig. 5 is a detail transverse section of the hopper taken through the feed mechanism. Fig. 6 is a detail vertical section of the seed-ejector.

Corresponding and like parts are referred to in the following description and indicated in all the views of the drawings by the same reference characters.

The device comprises a frame 1, composed of side bars 2 and 3, preferably arranged in parallel relation to each other and connected by any suitable bracing means, lending rigidity as well as lightness and combining other features of construction whereby advantages may be attained. A draft-beam 4, consisting of a head 5 and diverging arms 6, also connects the side bars 2 and 3, the arm 6 being bolted or otherwise secured thereto. A series of openings 7 in the head allows for adjustable connection of the whiffletree in the usual manner.

At the rear of the planter is situated a seed-hopper 8. This hopper is removable, being held in place by fastenings 9 of any ordinary form adapted for the purpose. A cover 10 is hinged to the top of the hopper, as will be readily seen. Handles 11 are fastened at the lower extremities to the side bars 2 and 3, intermediate the ends thereof, and are adjustably supported by brace-pieces 12. The latter are bolted to the side bars at one end and adapted, by reason of a series of openings in their upper ends, to make the adaptable connection with the handles above mentioned.

Secured to the under side of the hopper 8 is the furrow-opener 13, which is composed of the downwardly and rearwardly extending arms 14, which are fastened at their upper ends to the hopper and meet at their lower portion to form the shovel or blade 15. The arms are separated at their rear extensions to receive the grain-tube 16, connected with the hopper, and spread the furrow. In the rear of the furrow-opener 13 are located the furrow-closers 17, which are preferably two in number. These closers 17 are formed of blades 18, inwardly and spirally curved in the common manner. The blades 18 are pivoted to angle-plates 19, which comprise vertical and horizontal arms $a$ and $b$, the arm $b$ being secured to the frame or bottom of the hopper 8. The arm $b$ is perforated to receive a pivot, as shown at 20. To permit of adjustment of the blades 18 of the furrow-closers, curved slots 21 are provided upon the arms of the angle-plates 19, and bolts or like means passing through the blades and arms are adapted to hold the blades in their adjusted position.

The wheel 22 of the planter is journaled upon a rock-shaft 23, situated at the forward part of the frame, in front of the hopper 8.

This shaft 23 is provided with a crank 24, which is actuated by the wheel as it revolves. The hub of the wheel 22 is composed of plates 25, clamped together by suitable fastenings, between which the spokes thereof are secured. One of these plates 25 is grooved, as indicated at 26, and this groove receives a side of the crank which fits therein, thus making an interlocking connection between the wheel and crank. The hub of the wheel is clamped between the crank and a sleeve 27 upon the rock-shaft, the latter being held in position by a set-screw 38. Connected to the crank 24 is an arm 28, by which the seed-slide 29 is actuated.

The seed dropping or planting mechanism comprises the seed-slide 29, above mentioned, means for regulating the quantity of seed dropped, and means for projecting the seed into the grain-tube, giving a perfect action which does not admit of any of the seed dropping at irregular intervals as the operation of planting continues. The seed-slide 29 is perforated in the ordinary manner, the number of the perforations (designated 30) being dependent upon the kind of seed planted and the distance between the intervals at which it is desired to plant or drop the seed. The seed-slide moves in guides 31 and reciprocates over the opening in the hopper which leads to the grain-tube 16. Beneath the slide is secured a plate 31, which may be removed, allowing for the substitution of a thicker or thinner plate. This plate is fastened to the bottom of the hopper by screws or other suitable fastening devices, the purpose of its use being to allow for planting of different kinds of grain. This plate has also a perforation therein just above the mouth of the grain-tube to register with the perforations of the seed-plate. Above the grain-tube opening in the hopper is located a housing or casing 32, secured to the bottom thereof. This housing comprises side and end plates and has a block 33 therein. The block 33 is slotted to receive springs 34 and spring-actuated slides or cut-offs 35. The end plates of the housing are cut away to allow the seed to feed readily to the grain-tube. The seed-regulating slides 35 are approximately of L shape, the springs 34 bearing against the short arms thereof to keep same projected from the casing and in contact with the seed-slide 29. The slides 35 serve to level or even off the seed in the seed-pockets of the seed-slide 29, so that they deliver exactly the same quantity of seed to the grain-tube at each operation. The lower ends of the slides 35 are chamfered from the outer edges, so that there will be no likelihood or danger of clogging by any foreign matter in the seed-chamber, since the slides will readily move upward upon the slightest pressure upon the said chamfered end.

Often in planters of this construction the seed fails to drop from the perforations, and thus the planting is irregular. To obviate this disadvantage, a wheel or like means is provided at the lower portion of the block 33, just above the grain-tube, which bears against the seed-slide 29, and the contact of this wheel with the seed in the perforations of the said slide as it reciprocates forces same from the slide and causes it to drop into the tube 16 at each operation, as will be easily understood. In the operation of the planter the wheel revolving actuates the crank, and thereby the seed-slide is reciprocated. The seed within the hopper fills the perforations of the slide and is carried to the grain-tube. The drop-regulating slides 35 even off the grain within the said perforations, and the wheel 36 also coacts to project the seed from the slide into the grain-tube, as described.

To prevent the seed from being discharged from the hopper while the machine is being transported from place to place, a slide 37 on the bottom of the hopper may be pushed in, so as to close the opening leading to the grain-tube.

The different parts of the planter need not be constructed exactly in the manner substantially as shown, but may be modified and changed in any way found suitable and desirable by the inventor or manufacturer, such changes, however, being made with reference to the spirit and scope of the invention as regulated by the claims hereto appended.

Having thus described the invention, what is claimed as new is—

1. In a planter of the character described, a frame, a hopper located on the rear portion of the frame and having a perforated seed-slide mounted in guides therein, a wheel mounted upon a rock-shaft upon the frame and adapted to coöperate with the crank thereof to actuate the aforesaid slide, a furrow-opener comprising upwardly-diverging wings secured to the under side of the hopper, said wings being brought together at their front edges to form a blade and having spaced rear extensions to spread the furrow, a grain-tube extending from the hopper between the spaced extensions of the furrow-opener, furrow-closers comprising spirally and inwardly curved blades pivoted to angle-plates adjustably secured to the under side of the hopper, the blades being also adjustable upon the angle-plates, and means for holding the blades in their adjustable position, substantially as described.

2. In a corn-planter, a frame, a hopper located on the rear portion of the frame and having a perforated seed-slide mounted in guides therein, a wheel mounted upon a rock-shaft and having a longitudinal groove in the hub thereof to receive a side of the crank formed in said shaft and coöperating with said crank to actuate the seed-slide, a furrow-opener comprising upwardly-diverging wings secured to the under side of the hopper, said wings being brought together at their front edges to form a blade and having spaced rear extensions to spread the furrow, a grain-tube extending from the hopper between the spaced extensions of the furrow-opener, furrow-closers comprising spirally and inwardly curved blades pivoted to angle-plates adjustably secured to the under side of the hopper, the blades being also adjustable upon the angle-plates, and means for holding the blades in their adjustable position, substantially as described.

3. In a corn-planter, the combination of a frame, a hopper upon the frame, a seed-slide reciprocally mounted in the hopper, a wheel mounted upon a rock-shaft on said frame and coöperating with the crank thereof to actuate the seed-slide, means for equalizing the quantity of seed carried by the seed-slide from the hopper, means for positively delivering the seed from the said slide, a furrow-opener depending from the under side of the hopper and a grain-tube in rear of the opener, furrow-closers adjacent to the opener and in the rear thereof, each of the latter comprising an angle-plate having a slot upon the horizontal wing thereof for adjustment of same and having a slot and perforation upon the other wing, a spirally and inwardly curved blade pivoted to the vertical wing of the angle-plate and means coöperating with the slot upon the said wing whereby the blade is held in an adjustable position, substantially as described.

4. In a corn-planter of the character described, a frame, a hopper located upon the rear of the frame, a furrow-opener depending from the under side of the hopper and having a grain-tube extending in rear thereof, adjustable furrow-closers in rear of the opener, a perforated seed-slide mounted in guides in the said hopper, and a wheel mounted upon a rock-shaft in the frame, connections between the rock-shaft and seed-slide whereby the latter is actuated, means for equalizing the quantity of seed carried by the perforations of the seed-slide, the said means comprising a casing adjacent to the grain-tube opening in the hopper, and spring-actuated slides having lateral extensions forming stops to limit the downward movement of the same and to receive the end thrust of the springs and adapted to bear against the upper surface of the seed-slide whereby the seed in the perforations thereof is leveled and equalized, substantially as described.

5. In a corn-planter of the character described, a frame, a hopper located upon the rear of the frame, a furrow-opener depending from the under side of the hopper and having a grain-tube extending in rear thereof, adjustable furrow-closers in rear of the opener, a perforated seed-slide mounted in guides in the said hopper, and a wheel mounted upon a rock-shaft in the frame, connections between the rock-shaft and seed-slide whereby the latter is actuated, means for equalizing the quantity of seed carried by the perforations of the seed-slide, the said means comprising a casing adjacent to the grain-tube opening in the hopper, and L-shaped slides adapted for a vertical movement within the said casing, springs bearing against the short arms of the said slides to keep the lower extremities thereof in contact with the upper surface of the seed-slide, substantially as described.

6. In a corn-planter of the character described, a frame, a hopper located upon the rear of the frame, a furrow-opener depending from the under side of the hopper and having a grain-tube extending in rear thereof, adjustable furrow-closers in rear of the opener, a perforated seed-slide mounted in guides in the said hopper, and a wheel mounted upon a rock-shaft in the frame, connections between the rock-shaft and seed-slide whereby the latter is actuated, means for equalizing the quantity of seed carried by the perforations of the seed-slide, the said means comprising a casing adjacent to the grain-tube opening in the hopper, and a block secured within the casing, slots formed in the sides of said block to receive spring-actuated slides, the latter adapted to bear against the upper surface of the seed-slide to level and equalize the quantity of grain carried by the perforations therein, and means consisting of a wheel mounted for revolution within the casing and in contact with the reciprocating seed-slide whereby the seed within the said perforations is discharged therefrom into the grain-tube, substantially as described.

In testimony whereof I affix my signature in presence of two witnesses.

FREDERICK FORTMYER SMITH. [L.S.]

Witnesses:
E. C. KELLY,
H. J. GOCHENOUR.